United States Patent
Le Lievre

(10) Patent No.: US 7,823,798 B2
(45) Date of Patent: Nov. 2, 2010

(54) METHOD AND DEVICE FOR HEATING A MOTOR VEHICLE CABIN

(75) Inventor: Armel Le Lievre, Montesson (FR)

(73) Assignee: Peugeot Citroen Automobiles SA, Velizy Villacoublay (FR)

( * ) Notice: Subject to any disclaimer, the term of this patent is extended or adjusted under 35 U.S.C. 154(b) by 1057 days.

(21) Appl. No.: 10/553,886

(22) PCT Filed: Feb. 18, 2004

(86) PCT No.: PCT/FR2004/000383

§ 371 (c)(1),
(2), (4) Date: Jul. 14, 2006

(87) PCT Pub. No.: WO2004/096589

PCT Pub. Date: Nov. 11, 2004

(65) Prior Publication Data

US 2008/0011866 A1   Jan. 17, 2008

(30) Foreign Application Priority Data

Apr. 24, 2003   (FR) .................... 03 05071

(51) Int. Cl.
*B60H 1/02* (2006.01)
*F01N 3/20* (2006.01)
*F01N 5/02* (2006.01)
(52) U.S. Cl. ............. 237/12.3 B; 237/2 A; 237/12.3 R; 237/12.3 A; 60/320
(58) Field of Classification Search ............. 237/2 A, 237/12.3 B, 12.3 R, 12.3 A; 60/320
See application file for complete search history.

(56) References Cited

U.S. PATENT DOCUMENTS

| 4,335,849 | A | * | 6/1982 | van Bashuysen | ....... 237/12.3 R |
|---|---|---|---|---|---|
| 4,982,895 | A | * | 1/1991 | Shimizu et al. | ............. 237/2 A |
| 5,082,174 | A | | 1/1992 | Joji | |
| 5,192,021 | A | | 3/1993 | Knorr et al. | |
| 6,155,042 | A | * | 12/2000 | Perset et al. | ................... 60/278 |
| 6,464,027 | B1 | * | 10/2002 | Dage et al. | ............... 180/65.22 |
| 2001/0013409 | A1 | * | 8/2001 | Burk et al. | ................... 165/240 |
| 2002/0078681 | A1 | * | 6/2002 | Carberry et al. | ............... 60/280 |
| 2002/0157386 | A1 | * | 10/2002 | Hiranuma et al. | ............. 60/295 |
| 2003/0136113 | A1 | * | 7/2003 | Nakagawa et al. | ............. 60/285 |

FOREIGN PATENT DOCUMENTS

| DE | 10047810 A | | 4/2002 |
|---|---|---|---|
| DE | 10259702 A1 | * | 7/2003 |
| EP | 0985807 A | | 3/2000 |
| EP | 985807 A1 | * | 3/2000 |
| FR | 2821298 A | | 8/2002 |

* cited by examiner

Primary Examiner—Steven B McAllister
Assistant Examiner—Patrick F. O'Reilly, III
(74) Attorney, Agent, or Firm—Nicolas E. Seckel

(57) ABSTRACT

The invention relates to a method of heating a motor vehicle cabin by means of a circuit (20) for circulating a cooling fluid for cooling an engine (10) and including a pump (23), an air heater unit (22), and a heat exchanger (21) disposed in an exhaust system (15) that is also provided with a depollution assembly (16). The exhaust gas is directed towards the heat exchanger (21) or towards a bypass duct (18) downstream from the depollution assembly (16) as a function of engine operating conditions, of the outside temperature, of the heating temperature requested in the vehicle cabin, and of the temperature of the engine cooling fluid. The invention applies more particularly to direct injection diesel engines.

3 Claims, 2 Drawing Sheets

METHOD AND DEVICE FOR HEATING A MOTOR VEHICLE CABIN

Figure 1:
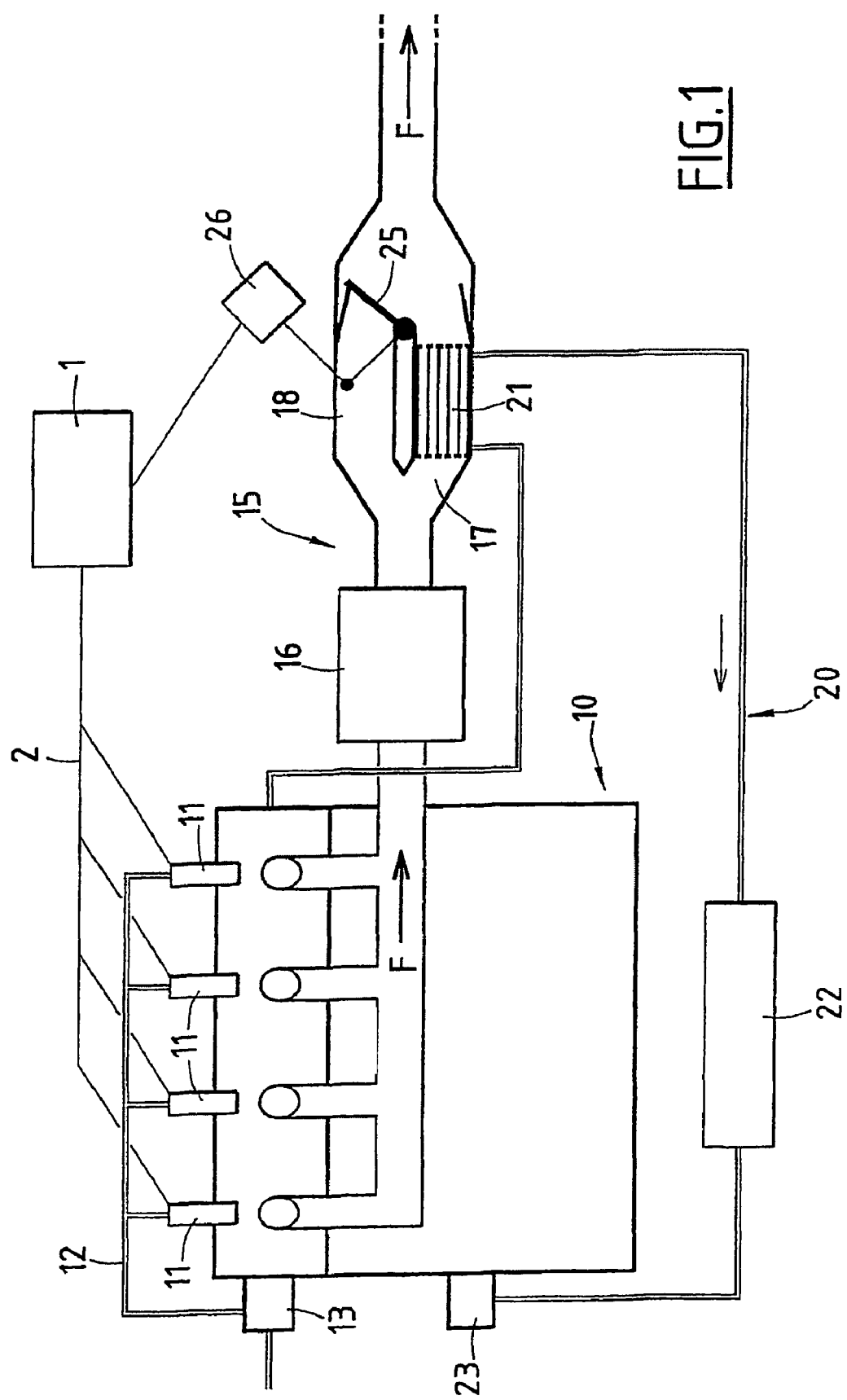

The present invention relates to a method and apparatus for heating a motor vehicle cabin.

In motor vehicles, the engine includes a circuit for circulating a cooling fluid which is used for cooling the engine and also for heating the cabin. To this end, the circuit includes in particular a pump and an air heater unit through which air is caused to flow to pick up heat stored in the cooling fluid for the purpose of heating the cabin.

However, in certain circumstances, and more particularly during the first few minutes of operation of the vehicle, or when the weather is particularly cold, such heater apparatus is not sufficient.

In order to improve cabin heating quickly, several techniques are presently in use.

One of those techniques consists in using electrical resistance elements, sometimes in the water circuit, but more generally in the air circuit. Another technique consists in using burners.

However those techniques give rise to problems of siting and they increase the cost of the vehicle. Furthermore, they lead to excess consumption and a non-negligible expenditure of energy, and when burners are used they also lead to odors and smoke.

Yet another technique consists in placing a heat exchanger in the exhaust system of the vehicle, upstream from a depollution unit, which heat exchanger is integrated in the circuit for circulating the engine's cooling fluid. Heat recovered from the exhaust gas in this way can thus serve to heat the vehicle cabin indirectly.

That disposition presents drawbacks lying mainly in the fact that it requires exhaust gas to flow slowly through the depollution assembly constituted by catalysts while the temperature of the engine is rising, i.e. when starting, in order to ensure that the depollution assembly reaches its optimum operating temperature quickly.

Consequently, during the starting stage, no additional heat energy is recovered for heating the cabin.

An object of the invention is to solve those problems and to improve cabin heating performance.

The invention thus provides a method of heating a motor vehicle cabin by means of a circuit for circulating a cooling fluid for cooling an engine and including a pump, an air heater unit, and a heat exchanger disposed in an exhaust system that is also provided with a depollution assembly, the method being characterized in that the exhaust gas in the exhaust system and downstream from the depollution assembly is directed towards said heat exchanger or towards a bypass duct as a function of engine operating conditions, of the outside temperature, of the heating temperature requested in the cabin, and of the temperature of the engine cooling fluid.

The invention also provides an apparatus for heating a motor vehicle cabin, the apparatus being of the type comprising a circuit for circulating a cooling fluid for cooling an engine and including a pump, an air heater unit, and a heat exchanger disposed in an exhaust system provided with a depollution assembly, the apparatus being characterized in that the heat exchanger is placed in said exhaust system downstream from the depollution assembly in the exhaust gas flow direction, and in that it includes a flap for directing the exhaust gas either towards the heat exchanger or towards a bypass duct, said flap being actuated by control means as a function of the operating conditions of the engine, of the outside temperature and of the heating temperature requested in the cabin and of the temperature of the engine cooling fluid.

Figure 2:
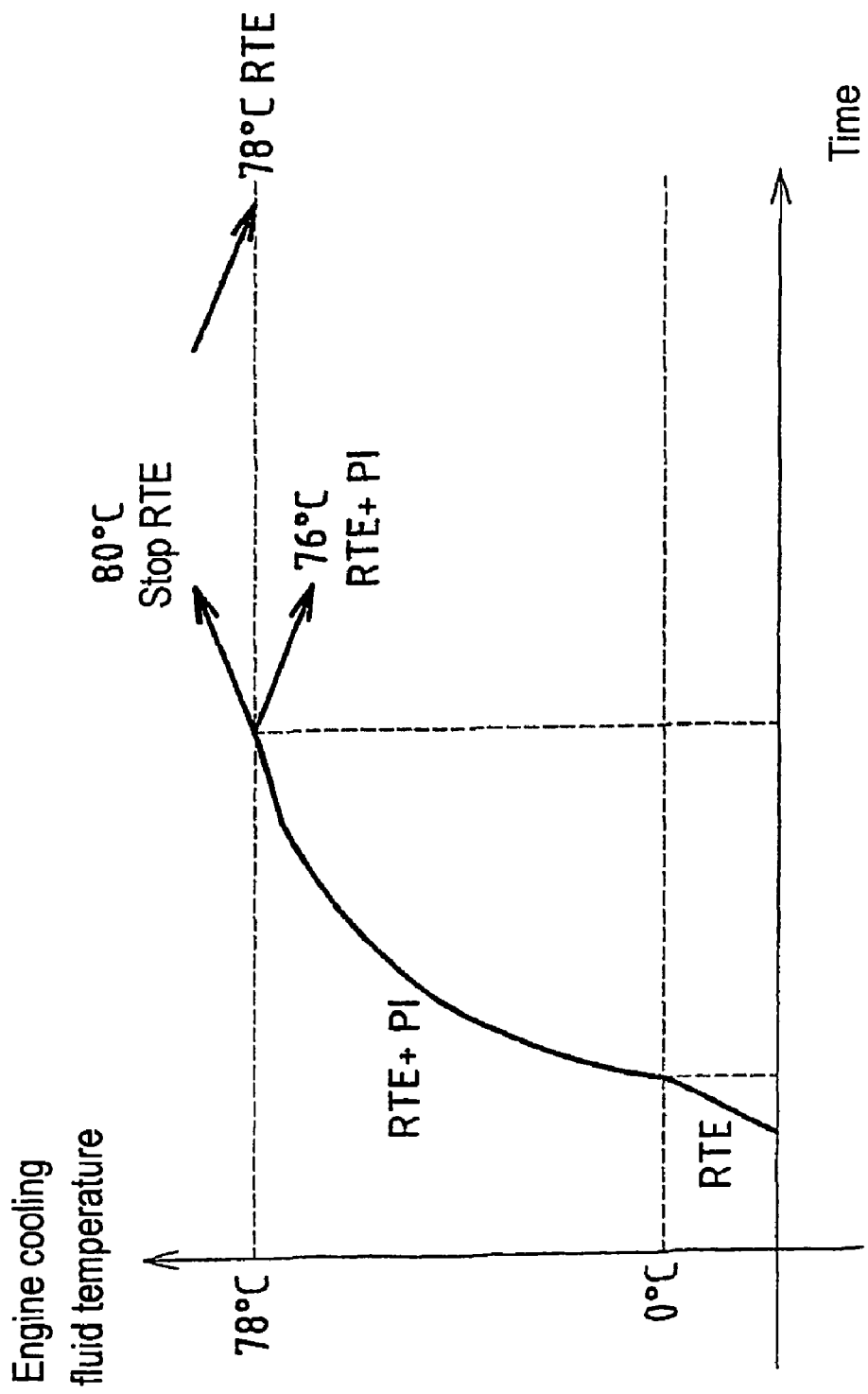

The invention can be better understood on reading the following description given by way of example and made with reference to the accompanying drawings, in which:

FIG. 1 is a diagram of an engine and its exhaust system fitted with cabin heater apparatus in accordance with the invention; and FIG. 2 is a curve plotting heat energy recovery from the exhaust system as a function of the temperature of the engine cooling fluid and as a function of time.

FIG. 1 is a diagram showing an engine 10, e.g. a direct injection diesel engine, which, in conventional manner, has injectors 11 fed with fuel by a circuit 12 including a high pressure pump 13. The injection of fuel by the injectors 11 into the cylinders of the engine 10 is controlled by means of a controller 1 connected to each injector 11 via an electrical circuit 2.

The engine 10 also has an exhaust system given overall reference numeral 15 that is provided with a depollution assembly 16 constituted by a catalyst and a particle filter, for example.

Downstream from the depollution assembly 16 in the exhaust gas flow direction, as shown by arrow F in the exhaust system 15, there are provided first and second passages 17 and 18 for the exhaust gas.

As shown in FIG. 1, the first passage 17 in the exhaust system 15 is fitted with a heat exchanger 21 for exchanging heat with a circuit 20 for circulating a cooling fluid for the engine 10, which circuit also includes an air heater unit 22 and a water pump 23. In conventional manner, a flow of air passes through the air heater unit 22 so as to recover heat stored in the cooling fluid circulating round the circuit 20, thereby serving to heat the cabin of the motor vehicle.

The exhaust gas is caused to flow through the first passage 17 or through the second passage 18 under the control of a flap 25 that is movable by means of an actuator 26, e.g. constituted by an electric motor, between a first position for closing the second passage 18, as shown in FIG. 1, and in which all of the exhaust gas flows along the first passage 17 through the heat exchanger 21, and a second position in which the flap closes the first passage 17 and in which it allows all of the exhaust gas to flow through the second passage 18, which then constitutes a bypass duct.

The actuator 26 is connected to the controller 1.

The flap 25 is tilted between its two positions in the flow direction of the gas in the exhaust system 15.

As shown in FIG. 1, the flap 25 is preferably disposed downstream from the heat exchanger 21 relative to the flow direction of the gas in the exhaust system 15.

Furthermore, the engine 10 includes means for injecting an additional quantity of fuel into at least some of the cylinders of said engine after the main injection of fuel therein and during the expansion stage of the cycle of these cylinders, so as to give rise to additional combustion of fuel and increase the temperature of the exhaust gas flowing in particular through the heat exchanger 21.

The controller can respond to various parameters such as the temperature of the cooling fluid for the engine 10, the outside temperature, a requested level for heating in the cabin, engine revolutions, and/or the load on the engine in order to adjust strategies for controlling the injectors 11 so as to change the way the energy budget of the fuel consumed is shared so that during starting stages when the heating power available for heating the cabin is insufficient, the amount of energy transferred to the walls of the engine is increased, thereby increasing the energy transferred to the circuit 20 for circulating the cooling fluid, and also increasing the energy transferred to the gas flowing in the exhaust system 15, i.e. through the depollution assembly 16 and the heat exchanger 21.

The system for heating the vehicle cabin is generally put into operation when the outside air temperature is less than 10° C.

The operating conditions of the engine 10 that are taken into account by the method of the invention are the torque and/or the speed of rotation of said engine.

In the method of the invention several strategies can be devised for recovering thermal energy from the exhaust (RTE) alone or in combination with injecting an additional quantity of fuel (PI) into at least some of the cylinders of said engine 10.

In general, the exhaust gas is directed to the heat exchanger 21 in order to recover thermal energy from the exhaust (RTE) without additional fuel injection (PI) into some of the cylinders for a determined maximum speed of rotation lying in the range 2500 revolutions per minute (rpm) to 3500 rpm, and/or for torque less than a determined maximum torque lying in the range 100 newton meters (Nm) to 200 Nm.

Similarly, the exhaust gas is directed towards the heat exchanger 21 without additional injection of fuel when the temperature of the cooling fluid is not below a temperature lying in the range 70° C. to 85° C., and preferably not below 80° C., while the outside temperature is not less than a temperature lying in the range 5° C. to 15° C., and preferably not less than 10° C.

Furthermore, the exhaust gas is directed to the heat exchanger 21 in order to recover thermal energy from the exhaust (RTE) while simultaneously injecting additional fuel (PI) into some of the cylinders of the engine 10 for a determined maximum speed of rotation lying in the range 2500 rpm to 3500 rpm, and/or for a determined torque lying between a maximum torque and a minimum torque which are functions of the speed of rotation of said engine 10.

Similarly, the exhaust gas is directed to the heat exchanger 21 while simultaneously injecting additional fuel into some of the cylinders when the temperature of the cooling fluid for the engine 10 lies between a minimum temperature lying in the range −5° C. to +5° C., and preferably of the order of 0° C., and a maximum temperature lying in the range 70° C. to 85° C., and preferably of the order of 80° C., while the outside temperature is less than a temperature lying in the range 5° C. to 15° C., and preferably of the order of 10° C.

With reference to FIG. 2, there follows a description of one example of an operating strategy for the method of the invention.

By way of example, the vehicle cabin heating system is set into operation when the temperature of the outside air is less than 10° C.

When the vehicle is started cold, with an outside air temperature of less than 10° C., in order to make the cabin comfortable, the controller engages recovery of thermal energy from the exhaust (RTE) on its own, while the temperature of the cooling fluid in the circuit 20 is below 0° C.

While thermal energy is being recovered from the exhaust, the actuator 26 causes the flap 25 to take up its position in which it closes the bypass duct 18 so that all of the exhaust gas flows through the first passage 17 and consequently through the heat exchanger 21 so as to increase the temperature of the cooling fluid circulating in the circuit 20.

As shown in FIG. 2, when the temperature of the cooling fluid for the engine 10 lies in the range 0° C. to 78° C., the controller 1 actuates thermal energy recovery from the exhaust by causing all of the exhaust gas to pass through the heat exchanger 21, and also causes an additional quantity of fuel to be injected into at least some of the cylinders of the engine 10, thereby increasing the temperature of the exhaust gas flowing through the heat exchanger 21, thus providing additional heat for heating the cabin of the motor vehicle.

For a cooling fluid temperature lying in the range 78° C. to 80° C., the controller 1 makes use solely of thermal energy recovery from the exhaust. This recovery of thermal energy from the exhaust is reengaged if the temperature of the cooling fluid of the engine drops below 78° C., as shown in FIG. 2.

Finally, recovery of thermal energy from the exhaust together with the injection of an additional quantity of fuel are both reengaged if the temperature of the cooling fluid in the circuit 20 drops below 76° C.

The various strategies mentioned above are given purely by way of example and could naturally be modified.

While the exhaust gas is flowing through the heat exchanger 21, the exhaust gas also flows through the depollution assembly 16. Thus, during the starting stage, while thermal energy is being recovered from the exhaust to heat the cabin via the heat exchanger 21, the exhaust gas continues to flow through the depollution assembly 16, thereby enabling the temperature in the depollution assembly to rise quickly, so that it reaches its optimum operating temperature in a very short length of time.

The invention claimed is:

1. Apparatus for heating a motor vehicle cabin, comprising:
   a circuit for circulating a cooling fluid for cooling an engine and including a pump, an air heater unit, and a heat exchanger disposed in an exhaust system provided with a depollution assembly,
   wherein the depollution assembly comprises a catalyst and a particle filter,
   wherein the heat exchanger is placed in said exhaust system downstream from the depollution assembly in the exhaust gas flow direction, and the exhaust system comprises a bypass duct in parallel with the heat exchanger, and
   a flap for directing the exhaust gas towards at least one of (i) the heat exchanger and (ii) the bypass duct, said flap being actuated as a function of engine operating conditions, of the outside temperature, of the heating temperature requested in the cabin, and of the temperature of the engine cooling fluid,
   wherein the engine is a direct injection diesel engine,
   and wherein the engine includes means for injecting an additional quantity of fuel into at least some of the cylinders of said engine after the main injection of fuel therein, and to do so during the expansion stage of the cycle in said cylinders, so as to give rise to additional combustion of fuel and increase the temperature of the gas flowing in the exhaust system and through the heat exchanger.

2. Apparatus according to claim 1, wherein the flap can be tilted between a first position for closing the bypass duct and a second position for opening the bypass duct, said tilting between said first and second positions taking place in the direction in which the gas flows along the exhaust system.

3. Apparatus according to claim 1, wherein the flap is disposed downstream from the heat exchanger relative to the gas flow direction in the exhaust system.

* * * * *